United States Patent [19]

Murtuza

[11] Patent Number: 5,101,927
[45] Date of Patent: Apr. 7, 1992

[54] AUTOMATIC BRAKE ACTUATION

[75] Inventor: Syed Murtuza, Bloomfield, Mich.

[73] Assignee: Regents of the University of Michigan, Ann Arbor, Mich.

[21] Appl. No.: 591,963

[22] Filed: Oct. 2, 1990

[51] Int. Cl.$^5$ .................. B60K 28/10; B60T 7/12
[52] U.S. Cl. ........................ 180/275; 293/118; 293/119
[58] Field of Search ............ 180/275, 274; 293/118, 293/119

[56] References Cited

U.S. PATENT DOCUMENTS

| 1,618,880 | 2/1927 | Johnson | 180/275 |
| 2,001,093 | 5/1935 | Cherpes et al. | 180/275 |
| 3,409,874 | 11/1968 | Bowler et al. | 180/275 |
| 4,641,871 | 2/1987 | Vaaughn | 180/275 |
| 4,674,590 | 6/1987 | Krieg | 180/275 |

Primary Examiner—Kenneth R. Rice
Attorney, Agent, or Firm—Brooks & Kushman

[57] ABSTRACT

An automatic brake actuation system for use on a vehicle having an existing braking system is disclosed as including an elongate detector mounted to the vehicle and being controllably extendable from the vehicle to contact objects being approached by the vehicle when at predetermined distances therefrom. A compression sensor is included to sense contact between the elongate detector and an object. Provision is also made to sense vehicle speed, vehicle-object closing speed, and detector position and to extend and retract the detector and actuate the vehicle braking system in response thereto.

26 Claims, 5 Drawing Sheets

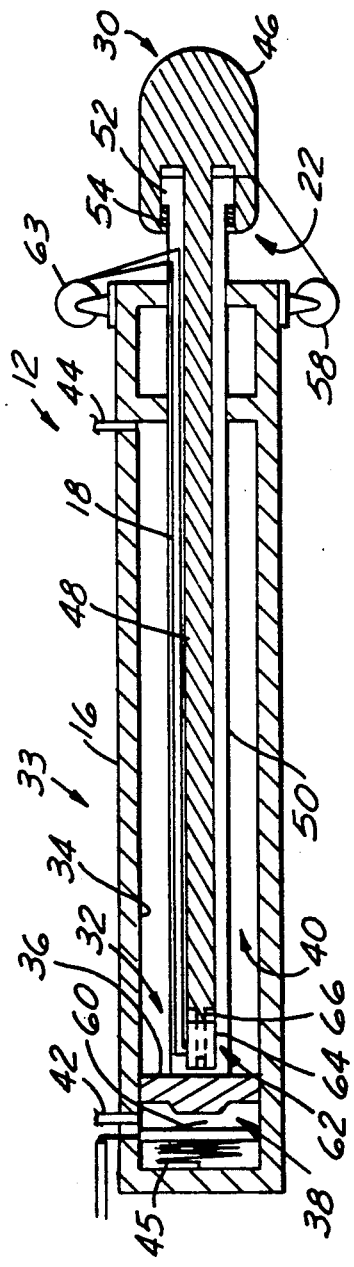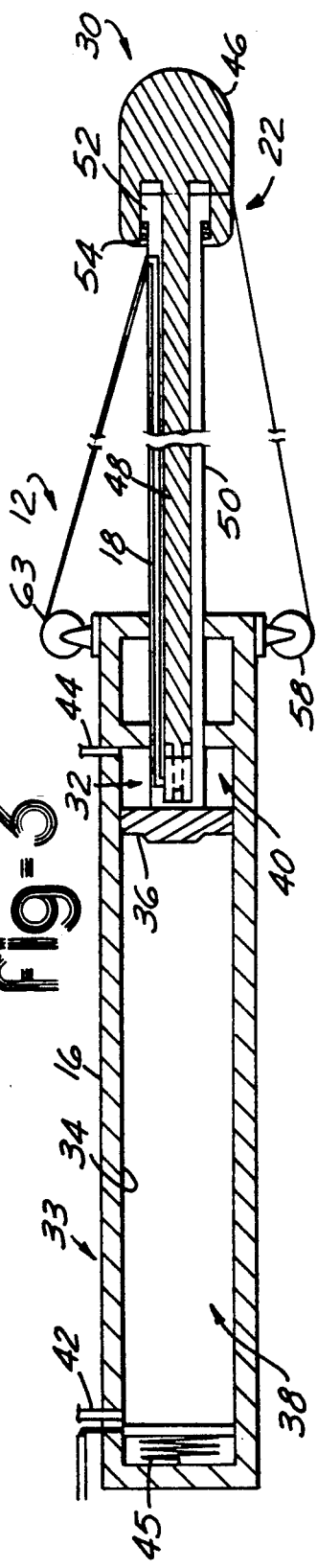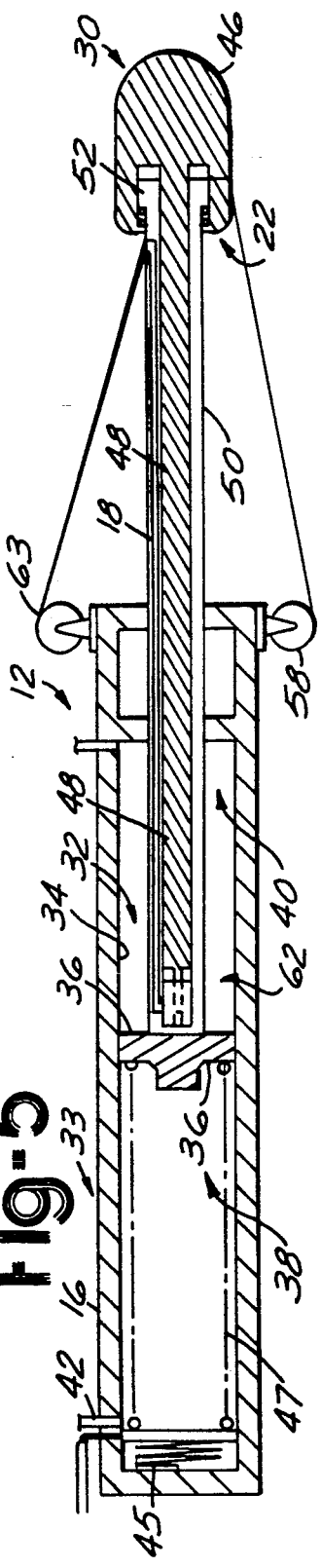

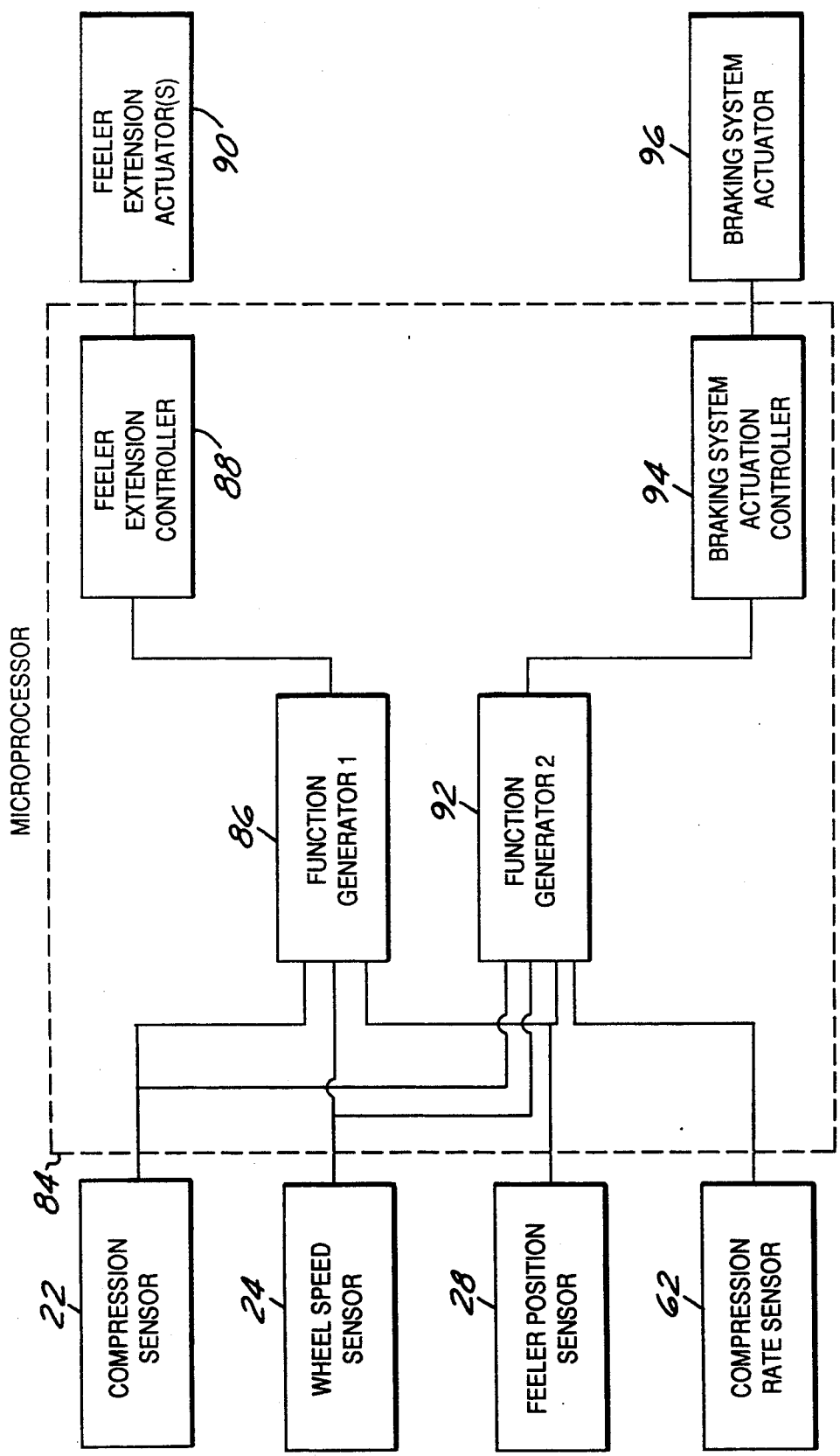

AUTOMATIC BRAKE ACTUATION

TECHNICAL FIELD

This invention relates to automatic brake actuating systems having controllably extendable object detectors for use on vehicles having existing braking systems.

BACKGROUND ART

Vehicular brake actuating devices have been known for many years. For example, U. S. Pat. No. 3,744,588 to Nave discloses a vehicular brake actuating device that actuates an existing braking system on a vehicle. The Nave device includes a contact bar disposed slightly ahead of a standard vehicle front bumper. Upon contacting an object, the bar is displaced and closes contacts of an electrical switch, which applies electric current from a battery to a solenoid. The solenoid has a core connected to an operating arm attached to a brake pedal of the vehicle braking system; and, when current is applied to the solenoid, the pedal is actuated.

U. S. Pat. No. 3,945,672 to Wong discloses an impact braking device including an extendable portion of a front bumper of a vehicle having an existing braking system. Upon contacting an object, a resulting displacement of the extendable portion releases a resiliently biased actuator that applies force through a cable to the braking system.

U. S. Pat. No. 4,591,019 to Fisher discloses a detector responsive fluid auxiliary braking system including a detector disposed at the rear of a vehicle. Upon contacting an object, the detector is displaced and actuates an air control valve. Compressed air controlled by the valve actuates the braking system.

U. S. Pat. No. 3,269,783 to Kriz discloses an overhead clearance detector for vehicles and includes a pair of vertically mounted antennae of unequal length. The antennae are aligned in the direction of vehicle forward motion with the tallest antenna disposed ahead of the shortest. When the tallest antenna is displaced by contact with an overhead obstruction, it actuates a switch that controls a warning system. If the shortest antenna is subsequently also displaced, it actuates another switch that controls an electric solenoid. The solenoid controls a valve that releases fluid under pressure to front and rear vehicle brakes U. S. Pat. No. 3,752,250 to Speer discloses a motor vehicle automatic impact braking system including projections extending beyond front and rear vehicle bumpers. Each projection has an associated expansible chamber that is compressed when the projection is impacted, thus pressurizing fluid within a line connected between each expansible chamber and a balancing chamber. The balancing chamber has a fluid output to auxiliary hydraulic cylinders disposed at each wheel brake.

U. S. Pat. No 3,718,356 to Gabella discloses a bumper and brake actuator assembly including a piston-cylinder apparatus that is mounted to a vehicle such that its axis of displacement is at right angles to that of a displaceable bumper. Impact energy is communicated from the bumper to opposite ends of the piston-cylinder apparatus by rotatable spheres displaceable within a pair of curved tubes. Impact forces displacing the bumper force fluid from the piston-cylinder apparatus to actuate vehicle brakes.

While each of these automatic brake actuating systems functions with a certain degree of efficiency, none discloses the advantages of the improved system of the present invention as is hereinafter more fully described.

DISCLOSURE OF INVENTION

An object of the present invention is to provide an improved automatic brake actuation system for use on a vehicle having an existing braking system, the automatic brake actuation system having a controllably extendable detector to sense contact with an object toward which the vehicle is moving.

Another object of the present invention is to provide an improved automatic brake actuation system wherein the extendable detector is retracted upon impacting an object.

Yet another object of the present invention is to provide an improved automatic brake actuation system wherein the detector is extended a distance that is a function of vehicle speed.

Still another object of the present invention is to provide an improved automatic brake actuation system wherein braking force applied is a function of vehicle speed and of vehicle-object closing speed.

In realizing the aforementioned and other objects, the automatic brake actuation system of the present invention includes an elongate detector, and preferably two, mounted to a vehicle. Each elongate detector has a support member mounted to the vehicle and an elongate feeler supported by the support member. The feeler has a longitudinal axis and is slidably extendable, by specific amounts, from the support member along that axis to detect an object being approached by the vehicle when at predetermined distances therefrom. A compression sensor is included to sense a contact between the elongate detector and the object. Provision is also made to sense vehicle speed, vehicle-object closing speed, and detector position and to extend and retract the detector and actuate the vehicle braking system as functions thereof.

In one embodiment of the automatic brake actuation system, the feeler longitudinally telescopes into the support member. The feeler has a free end and a confined end. The support member forms a feeler cylinder having an inside surface and within which the confined end of the feeler slides.

The feeler has attached or formed at its confined end a piston plate that forms a sliding seal with the inside surface. The piston plate divides the feeler cylinder into an extending portion and a retracting portion. The volume of one portion is a complement of the volume of the other portion, each being dependent on the position of the piston plate, the total volume being substantially constant.

The support member has connected thereto an extending fluid port that communicates with the extending portion of the feeler cylinder and also has connected thereto a retracting fluid port that communicates with the retracting portion. In this embodiment, fluid forced through the extending port into the extending portion of the feeler cylinder exerts a force against the piston plate and longitudinally drives the feeler at least partially from the feeler cylinder.

The feeler may be retracted by venting fluid from the extending portion of the feeler cylinder through the extending port and forcing fluid through the retracting port into the retracting portion of the feeler cylinder, exerting a force on the piston plate and longitudinally retracting the feeler into the feeler cylinder. In a variation of this embodiment, fluid pressure is removed; and the feeler is retracted by other means.

In another embodiment of the automatic brake actuation system, each feeler is extended by means of a linear motor. The linear motor has stator windings disposed along the support member and a feeler winding disposed along the feeler. The support member and the feeler in this embodiment have substantially rectangular transverse cross sections.

The linear motor is a multiphase induction motor. When the stator windings are connected to a source of multiphase, alternating electric current having a first phase sequence, a linear force is applied to the feeler winding in a first direction, extending the feeler from the support member. When the current applied to the feeler winding has a second phase sequence, a linear force is applied to the feeler in a second direction, withdrawing the feeler into the support member.

In another embodiment, each feeler is extended by means of an electric motor mounted to the vehicle. The electric motor has a rotatable shaft that is coupleable to the feeler to exert an axial force upon the feeler in an extending direction in response to an application of electric current in a first direction to the motor. The feeler may be retracted by applying an electric current to the motor in a second, or opposite, direction. In a variation of this embodiment, the rotatable shaft is decoupled from the feeler, and the latter is retracted by other means.

The rotatable shaft of the motor may be coupled to the feeler through a pinion gear connected to and rotatable with the rotatable shaft. In this embodiment, the feeler has a rack connected thereto, or formed therein, that is engageable with the pinion. With the pinion and the rack mutually engaged, an angular displacement of the rotatable shaft is translated into a longitudinal displacement of the feeler.

In still another embodiment of the automatic brake actuating system, the rotatable shaft of the motor is coupled to the feeler through a worm gear connected to and rotatable with the rotatable shaft. In this embodiment, the feeler has a worm connected thereto, or formed therein, that is engageable with the worm gear. With the worm gear and the worm mutually engaged, an angular displacement of the rotatable shaft is translated into a longitudinal displacement of the feeler.

Another embodiment of the automatic brake actuating system includes a support member mounted to the vehicle, the support member having a hollow, cylindrical portion. The embodiment also includes an inflatable feeler tube having an open end and a closed end. The open end is connected to and supported by the support member, the hollow, cylindrical portion of the support member connecting the feeler tube to a source of fluid under pressure for inflating the feeler tube. The feeler tube has a coiled configuration when deflated and an elongate configuration when inflated.

A spiral spring is attached along one side of the feeler tube to maintain the feeler tube in a coiled configuration until the feeler tube is inflated and to return the feeler tube to a coiled configuration when the feeler tube is deflated. A compression sensor is disposed on the spiral spring proximate the closed end of the feeler tube to sense a contact between the feeler tube and an object. Strain gauges are disposed along the length of the spiral spring to detect sharp curvature changes in the spring caused by laterally directed impacts.

Yet another embodiment of the automatic brake actuating system includes a support member mounted to the vehicle, the support member having formed therein a parallel-bar expanding feeler cylinder having an inside surface. The embodiment also includes a piston having a confined end and a free end. The confined end resides within the parallel-bar expanding feeler cylinder, and the free end extends outwardly therefrom. A piston plate is attached to or formed in the confined end of the piston and forms a slidable seal with the inside surface of the parallel-bar expanding feeler cylinder, dividing the cylinder into an expending portion and a retracting portion.

A parallel-bar expanding feeler is also included. It has a first set of 1 through n bars and a second set of 1 through n bars. The bars in both sets have substantially the same dimensions and are disposed in a common plane. Each bar of each set has a first end and a second end. The first end of bar 1 of the first set is pivotally connected to the support member, and the first end of bar 1 of the second set is pivotally connected to the free end of the piston. The center of bar 1 of the first set is pivotally connected to the center of bar 1 of the second set. The second end of bar 1 of the first set is pivotally connected to the first end of bar 2 of the first set, and the second end of bar 1 of the second set is pivotally connected to the first end of bar 2 of the second set. This sequence of pivotal connections is continued through bar n of the first set and bar n of the second set.

Also included is a first terminal bar having a first end and a second end and a second terminal bar having a first end and a second end. The lengths of the terminal bars are half that of the other bars. The first end of the first terminal bar is pivotally connected to the second end of bar n of the first set, and the first end of the second terminal bar is pivotally connected to the second end of bar n of the second set. The second end of the first terminal bar is pivotally connected to the second end of the second terminal bar. The contact sensing means is disposed at the juncture of the first and second terminal bars.

When fluid is forced into the extending portion of the parallel-bar expanding feeler cylinder and vented from the retracting portion, the piston is retracted, pulling the first end of bar 1 of the second set of bars toward the first end of bar 1 of the first set of bars and forcing the parallel-bar expanding feeler to expand. Conversely, when fluid is forced into the retracting portion of the parallel-bar expanding feeler cylinder and vented from the extending portion, the piston is extended, forcing the first end of bar 1 of the second set of bars away from the first end of bar 1 of the first set of bars and forcing the parallel-bar expanding feeler to retract.

In some of the previously described embodiments, the other means by which the feeler is retracted includes a resilient member, which may be a helical spring, connected between the feeler and the support member. As the feeler is extended, the spring is put under tension, storing energy therein. When the extending force is removed and the feeler is left free to move longitudinally, the energy stored in the spring retracts the feeler. A damping device may also be mounted to the support member to halt motion of the feeler after it has been retracted.

A number of sensors are included in the automatic brake actuation system. A compression sensor is disposed on the feeler. It is basically an electrical switching device having contacts that are transferred from an open or closed state to the opposite state when the force of the feeler striking an object is applied to the compression sensor. The state of the contacts is monitored to determine the occurrence of such a contact.

A compression rate sensor is also disposed on the feeler. It may be a linear velocity transducer that generates an electrical signal proportional to the rate of compression of the compression rate sensor and with which the relative closing speed of the vehicle and the object may be determined.

A vehicle wheel speed sensor is coupled to a wheel of the vehicle. From its output, the vehicle speed can be determined. A feeler position sensor is coupled to the feeler to sense the longitudinal position of the feeler and determine how far the latter is extended from the vehicle.

A microprocessor is also included in the automatic braking actuation system and is electrically connected to the compression, compression rate, vehicle wheel speed and feeler position sensors. The microprocessor monitors the sensors and, as a function thereof, and in accordance with preselected program parameters, controls the extension and retraction of the feeler and the actuation of the vehicle braking system.

The microprocessor includes a first function generator that is responsive to signals indicating the position of the feeler, the vehicle speed and object contact to generate a feeler positioning signal. The latter signal is communicated to a feeler extension controller to control the extension of the feeler.

The microprocessor also includes a second function generator that is responsive to signals indicating the position of the feeler, the vehicle speed, object contact and vehicle-object closing speed to generate a braking system actuating signal. The latter signal is communicated to a braking system actuation controller to control automatic braking.

A method for automatically actuating an existing braking system on a vehicle approaching an object when contact with the object is made includes sensing vehicle speed, extending a detector from the vehicle by a predetermined amount as a function of vehicle speed, sensing the object upon contacting it with the detector, retracting the detector upon contacting the object, sensing the relative closing speed of the vehicle and the object, and actuating the braking system upon object contact to brake the vehicle as a function of the detector position, the vehicle speed, and the relative closing speed of the vehicle and the object.

The objects, features and advantages of the present invention are readily apparent from the following detailed description of the best mode for carrying out the invention when taken in connection wit accompanying drawings.

BRIEF DESCRIPTION OF DRAWINGS

In the drawings, in which like reference characters indicate corresponding parts in all the views:

FIG. 2 is a sectional view of an embodiment, disposed in a first condition, of the invention;

FIG. 3 is a view of the embodiment illustrated by FIG. 2 and shown disposed in a second condition;

FIG. 5 is a view of a variation of the embodiment illustrated by FIG. 2;

FIG. 15 is a schematic diagram of the automatic brake actuation system of the present invention.

BEST MODE FOR CARRYING OUT THE INVENTION

Figure 1:
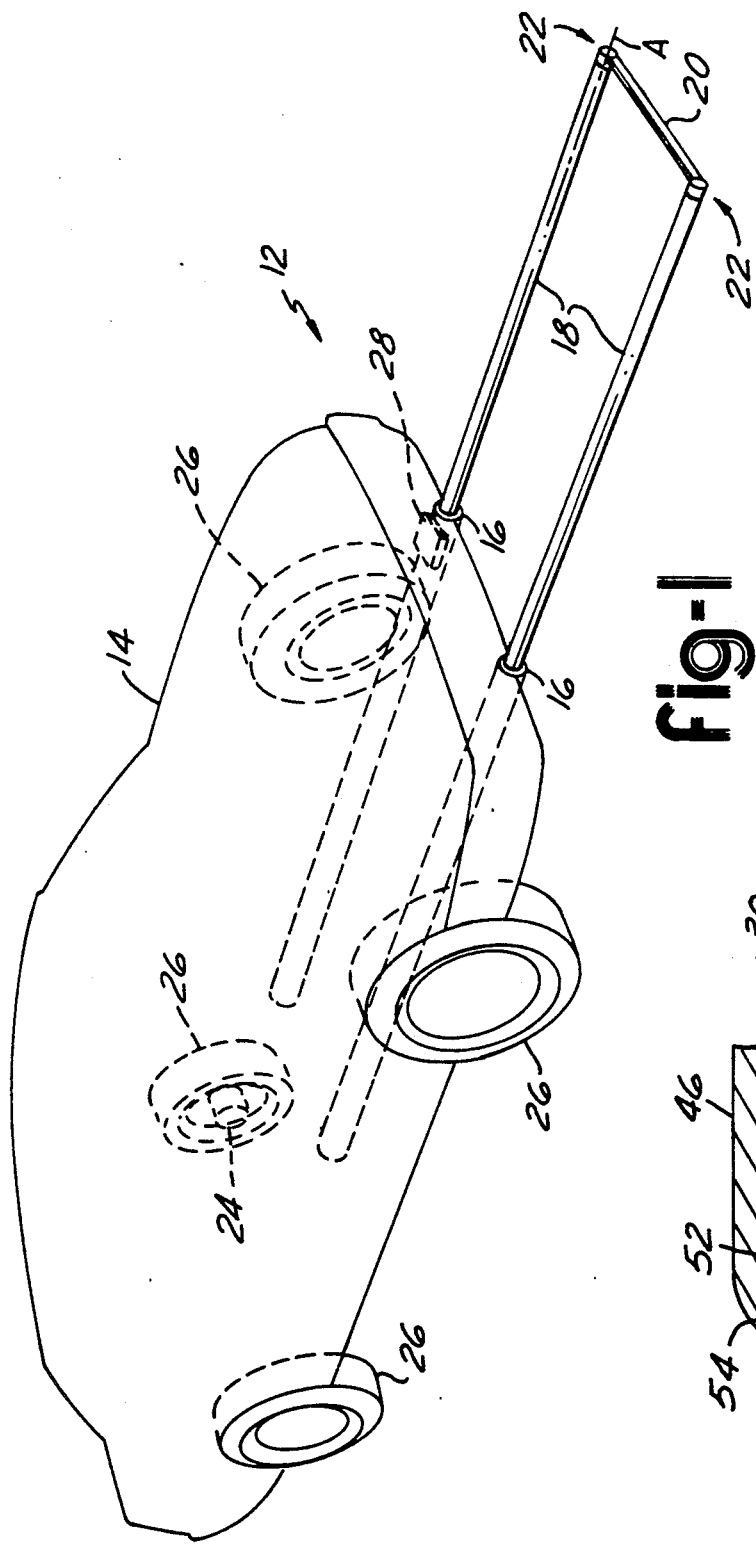
FIG. 1 is a perspective, shadow-line representation of an automobile having the automatic brake actuation system of the present invention mounted thereto.

With reference to FIG. 1 of the drawings, an automatic brake actuation system, generally indicated by reference numeral 10, of the present invention includes a pair of elongate detectors, generally indicated by reference numeral 12, mounted to a vehicle 14 in a parallel, spaced-apart relationship. Each elongate detector 12 has a support member 16 mounted to the vehicle 14 and an elongate feeler 18 slidably supported by the support member 16. Each feeler 18 has a longitudinal axis A and is slidably extendable, by specific amounts, from the support member 16 along the axis A to detect an object, for example, another vehicle, being approached by the vehicle 14 when at predetermined distances therefrom.

The support members 16 and the feelers 18 may be made of aluminum alloy, plastic or steel. Their preferred dimensions for automotive applications may typically be in the range of three to six feet in length and one to two inches in diameter. The feelers 18 may have attached to their free ends a link 20 made of similar material.

A compression sensing means, or sensor, generally indicated by reference numeral 22, is attached to the detector 12 to sense a contact between the feeler 18 and the object. The sensor 22 is a typically a microswitch. A vehicle wheel speed sensing means, or sensor, 24 is attached to a wheel 26 to sense angular velocity thereof, and a feeler position sensing means, or sensor, 28 is attached to the support member 16 to sense the longitudinal position of the feeler 18 with respect to the vehicle 14.

With reference to FIG. 2 of the drawings, in one embodiment of the automatic brake actuation system 10, the feeler 18 longitudinally telescopes into the support member 16. The feeler 18 has a free end, generally indicated by reference numeral 0, and a confined end, generally indicated by reference numeral 32. The support member 16 forms a feeler cylinder, generally indicated by reference numeral 33, having an inside surface 34 and within which the confined end 32 of the feeler 18 slides.

The feeler 18 has attached or formed at its confined end 32 a piston plate 36 that forms a sliding seal with the inside surface 34. The piston plate 36 divides the feeler cylinder 33 into a feeler extending portion, generally indicated by reference numeral 38, and a feeler retracting portion, generally indicated by reference numeral 40. The volume of one portion is a complement of the volume of the other portion, each being dependent on the position of the piston plate 36, the total volume being substantially constant.

The support member 16 has connected thereto a feeler extending fluid port 42 that communicates with the feeler extending portion 38 of the feeler cylinder 33 and also has connected thereto a feeler retracting fluid port 44 that communicates with the feeler retracting portion 40. In this embodiment, fluid forced through the feeler extending port 42 into the feeler extending portion 38 of the feeler cylinder 33 exerts a force against the piston plate 36 and longitudinally drives the feeler 18 at least partially from the feeler cylinder 33. This condition is illustrated by FIG. 3 of the drawings. The feeler 18 may be retracted by venting fluid from the feeler extending portion 38 of the feeler cylinder 33 through the feeler extending port 42 and forcing fluid through the feeler retracting port 44 into the feeler retracting portion 40 of the feeler cylinder 33, exerting a force on the piston plate 36 and longitudinally retracting the feeler 18 into the feeler cylinder 33. A damping device, for example, a damping spring 45, is mounted to the support member 16 and is disposed to absorb force from the feeler 18 being retracted.

The feeler 18 shown in FIG. 2 may be made of aluminum alloy or plastic, and the piston plate 36, the head portion 46, the inner body portion 48, and the outer body portion 50 may also be made of similar material.

FIG. 5 of the drawings shows a variation of the retracting method just described. Fluid pressure is removed from the feeler extending fluid port 42, and the feeler 18 is retracted by a retracting spring 47 connected between the piston plate 36 and the support member 16. The retracting spring 47 stores energy as it is placed under tension by the extending feeler 18 and retracts the feeler 18 when the latter is free to move. This arrangement reduces the time required for the feeler to retract.

Figure 4:
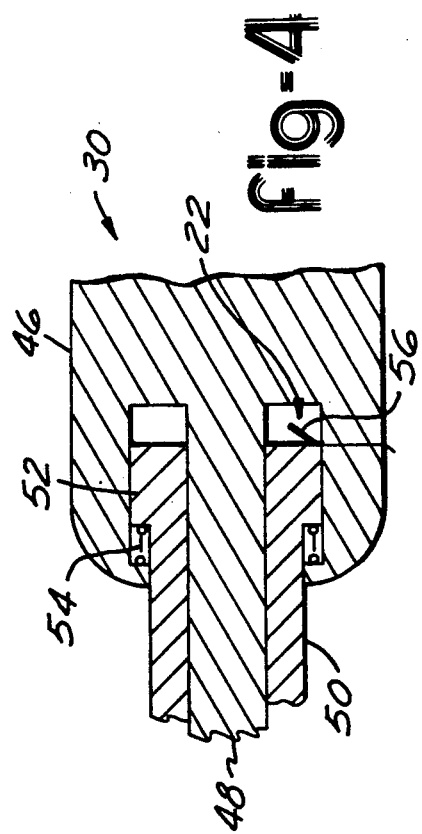
FIG. 4 is a partial, sectional view of a portion of the embodiment of FIGS. 1 and 2.

The compression sensor 22 is illustrated generally in FIG. 1 of the drawings. An embodiment of it is shown in some detail in FIGS. 2 and 4. In this embodiment, the feeler 18 includes a head portion 46, an inner body portion 48 extending longitudinally therefrom and an outer body portion 50 extending coaxially with the inner body portion 48. The outer body portion 50 completely encloses the inner body portion 48 and slidably extends at one end 52 into a cylindrical recess in the head portion 46. The end 52 of the outer body portion 50 and the head portion 46 are apposingly flanged so that the end 52 of the outer body portion 50 is retained within the recess in the head portion 46, their relative longitudinal position being resiliently maintained by a head spring 54.

When contact is made between the feeler 18 and an object approached by the vehicle 14, the head portion 46 is forced, against the resilient biasing of the head spring 54, toward the support member 16 and along the end 52 of the outer body portion 50. As best seen with reference to FIG. 4 of the drawings, the compression sensor 22 includes an electric compression switch, typically a microswitch, 56 disposed in the recess of the head portion 46 so that it is actuated whenever the head portion 46 is slid along the end 52 of the outer body portion 50. As shown in FIGS. 2 and 3, electric wires connected to the compression switch 56 are stored on, and resiliently dispensed and retracted by, a compression switch wire spool 58, mounted to the support member 16, as the feeler 18 is extended from and retracted into the support member 16.

With reference again to FIG. 2 of the drawings, an electric retract switch 60 is shown mounted to the support member 16 and is disposed so that it is actuated when the feeler 18 is fully retracted into the support member 16. A compression rate sensing means, or sensor, generally indicated by reference numeral 62, is mounted to the confined end 32 of the feeler 18. In the embodiment shown, the compression rate sensor 62 includes a linear velocity transducer having a stationary portion 64 mounted to the outer body portion 50 at the confined end 32 of the feeler 18 and a slidable portion 66 connected to the inner body portion 48.

When contact is made between the feeler 18 and an object approached by the vehicle 14, the resulting motion of the inner body portion 48 forces the slidable portion 66 to move through the stationary portion 64 of the compression rate sensor 62, causing the latter to generate an electrical signal proportional to the rate of compression of the compression rate sensor 62 and with which the relative closing speed of the vehicle 14 and the object may be determined. Electric wires connected to the compression rate sensor 62 are stored on, and resiliently dispensed and retracted by, a compression rate sensor wire spool 63, mounted to the support member 16, as the feeler 18 is extended from and retracted into the support member 16.

As shown in FIG. 1 of the drawings, a vehicle wheel speed sensor 24 is coupled to a wheel 26 of the vehicle 14 to sense angular velocity of the wheel. From the output of the vehicle wheel speed sensor 24, vehicle speed can be determined. As also shown in FIG. 1, a feeler position sensor 28 is coupled to the feeler 18 to sense the longitudinal position of the feeler 18 to ensure that the latter is extended from the vehicle 14 by a desired amount.

Figure 6:
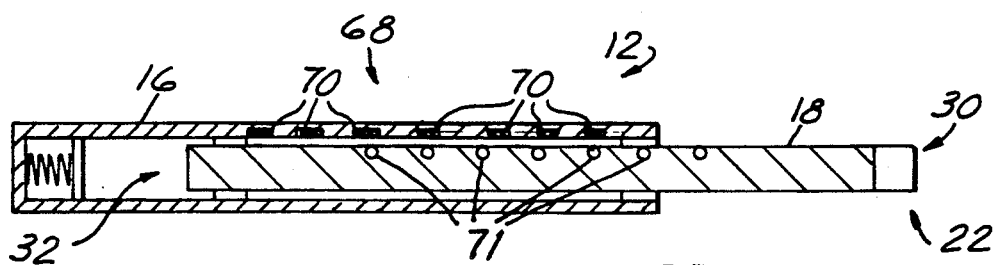
FIG. 6 is a sectional view of another embodiment of the invention.

As shown in FIG. 6 of the drawings, in another embodiment of the automatic brake actuation system 10, each feeler 18 is extended by means of a linear motor, generally indicated by reference numeral 68. The linear motor 68 has stator windings 70 disposed along the support member 16 and a feeler winding 71 disposed along the feeler 18. The support member 16 and the feeler 18 have substantially rectangular transverse cross sections.

The linear motor 68 is a multiphase, electric induction motor. When the stator windings 70 are connected to a source of multiphase, alternating electric current having a first phase sequence, a linear force is applied to the feeler winding 71 in a first direction, extending the feeler 18 from the support member 16. When the current applied to the stator windings 70 has a second phase sequence, a linear force is applied to the feeler winding 71 in a second direction, withdrawing the feeler 18 into the support member 16.

The support member 16 and the feeler 18 shown in FIG. 6 is made of magnetic material, and the associated conductors and windings are made of copper or other electrically conducting material.

Figure 7:
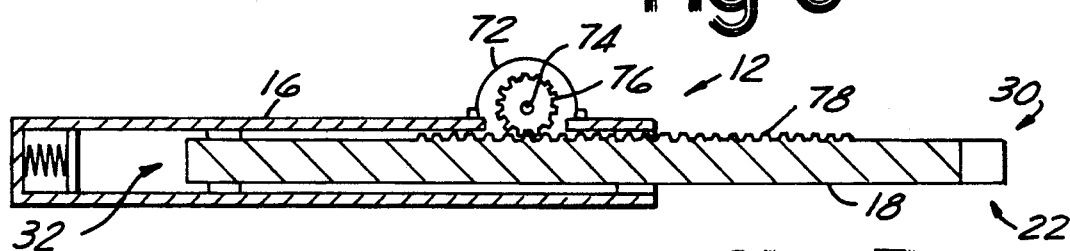
FIG. 7 is a view, partially in section, of still another embodiment of the invention.

In another embodiment, shown in FIG. 7 of the drawings, each feeler 18 is extended by means of an electric motor 72 mounted to the support member 16.

The electric motor 72 has a rotatable shaft 74 that is coupleable to the feeler 18 to exert an axial force upon the feeler 18 in an extending direction in response to an application of electric current in a first direction to the motor 72. The feeler 18 may be retracted by applying an electric current to the motor 72 in a second, or opposite, direction. In a variation of this embodiment, the rotatable shaft 74 is decoupled from the feeler 18; and the latter is retracted by other means, such as by a spring similar to that shown in FIG. 5.

The rotatable shaft 74 of the electric motor 70 may be coupled to the feeler 18 through a pinion 76 connected to and rotatable with the rotatable shaft 74. In this embodiment, the feeler 18 has a rack 78 connected thereto, or formed therein, that is engageable with the pinion 76. With the pinion 76 and the rack 78 mutually engaged, an angular displacement of the rotatable shaft 74 is translated into a longitudinal displacement of the feeler 18.

Figure 8:
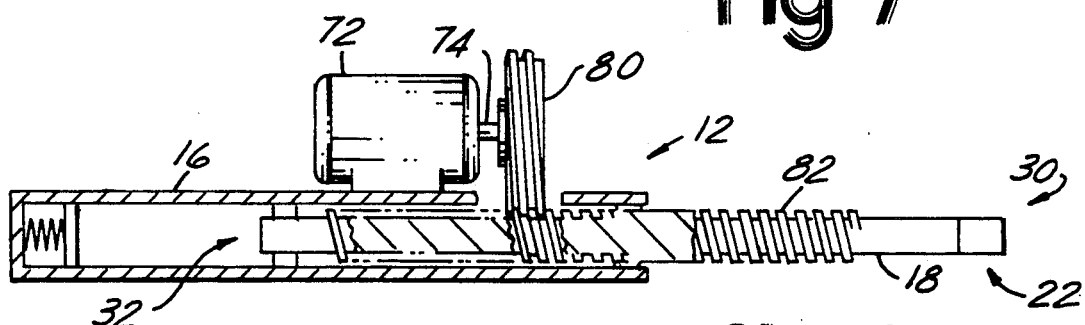
FIG. 8 is a view, partially in section, of yet another embodiment of the invention.

Shown in FIG. 8 of the drawings is still another embodiment of the brake actuating system 10, wherein the rotatable shaft 74 of the electric motor 72 is coupled to the feeler 18 through a worm gear 80 connected to and rotatable with the rotatable shaft 74. In this embodiment, the feeler 18 has a worm 82 connected thereto, or formed therein, that is engageable with the worm gear 80. With the worm gear 80 and the worm 82 mutually engaged, an angular displacement of the rotatable shaft 74 is translated into a longitudinal displacement of the feeler 18.

Figure 9:
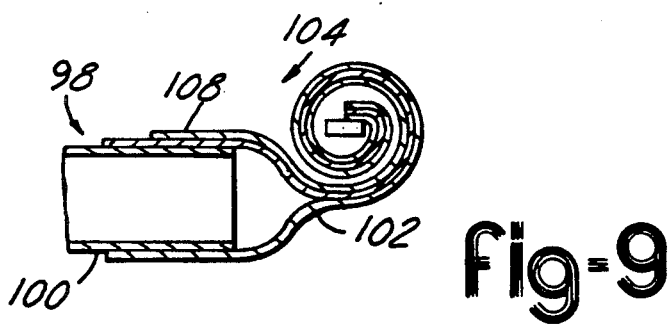
FIG. 9 is a sectional view of another embodiment, shown in a first condition, of the invention.
Figure 10:
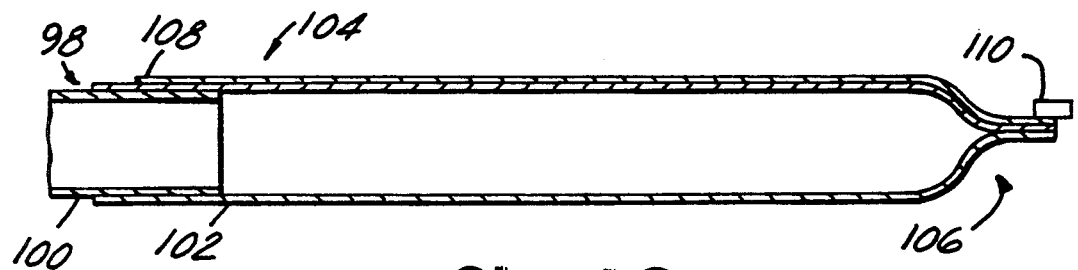
FIG. 10 is a view of the embodiment illustrated by FIG. 9 and shown in a second condition.

Another embodiment of the automatic brake actuating system 10 is shown in FIGS. 9 and 10 of the drawings and includes a support member, generally indicated by reference numeral 98, mounted to the vehicle 14, the support member 98 having a hollow, cylindrical portion 100. The embodiment also includes an inflatable feeler tube 102 having an open end, generally indicated by reference numeral 104, and a closed end, generally indicated by reference numeral 106. The open end 102 is connected to and supported by the support member 98, the hollow, cylindrical portion 100 of the support member 98 connecting the feeler tube 102 to a source of fluid under pressure for inflating the feeler tube 102. The feeler tube 102 has a coiled configuration when deflated (as shown in FIG. 9) and an elongate configuration when inflated (as shown in FIG. 10).

A spiral spring 108 (shown in more detail in FIGS. 11 and 12) is attached along one side of the feeler tube 102 to maintain it in a coiled configuration until the feeler tube 102 is inflated. The feeler tube 102 is maintained in an inflated and elongated configuration until the inflating fluid is vented therefrom. When the fluid is vented, the feeler tube 102 deflates and is returned to a coiled configuration under the resilient urging of the spiral spring 108.

Figure 11:
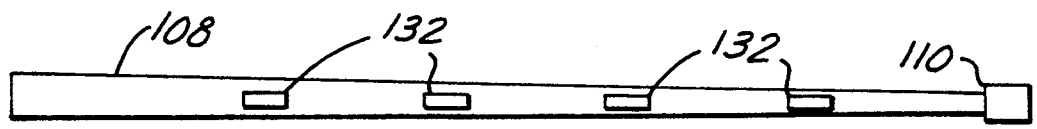
FIG. 11 is a plan view of an element of the embodiment illustrated by FIGS. 9 and 10.
Figure 12:
FIG. 12 is a side view of the element illustrated by FIG. 11.

FIG. 11 is a top view of the spiral spring 108. The spring 108 is shown in an uncoiled state, revealing a tapered configuration. A side view of the uncoiled spring 108 is shown by FIG. 12, revealing a substantially flat configuration. A contact, or compression, sensing means, or sensor, 110 is disposed on the spiral spring 108 proximate the closed end 106 of the feeler tube 102 to sense a contact between the feeler tube 102 and an object (not shown). Strain gauges 132 are disposed along the length of the spiral spring 108 to detect sharp curvature changes in the spring 108 caused by laterally directed impacts.

Yet another embodiment of the automatic brake actuating system 10 includes a support member, generally indicated by reference numeral 112 mounted to the vehicle, the support member 112 having formed therein a parallel-bar expanding feeler cylinder 114 having an inside surface 116. The embodiment also includes a piston 118 having a confined end, generally indicated by reference numeral 120, and a free end, generally indicated by reference numeral 122. The confined end 120 resides within the parallel-bar expanding feeler cylinder 114, and the free end 122 extends outwardly therefrom. A piston plate 124 is attached to or formed in the confined end 120 of the piston 118 and forms a slidable seal with the inside surface 116 of the parallel-bar expanding feeler cylinder 114, dividing the cylinder 114 into an extending portion, generally indicated by reference numeral 126, and a retracting portion, generally indicated by reference numeral 128.

A parallel-bar expanding feeler 130 is also included. It has a first set of 1 through n bars and a second set of 1 through n bars. The bars in both sets have substantially the same dimensions and are disposed in a common plane. Each bar of each set has a first end and a second end. The first end 132 of bar 1 134 of the first set of bars is pivotally connected to the support member 112, and the first end 136 of bar 1 138 of the second set is pivotally connected to the free end 122 of the piston 118. The center 140 of bar 1 134 of the first set is pivotally connected to the center 140 of bar 1 138 of the second set. The second end 142 of bar 1 134 of the first set is pivotally connected to the first end 142 of bar 2 146 of the first set, and the second end 144 of bar 1 138 of the second set is pivotally connected to the first end 144 of bar 2 148 of the second set. This sequence of pivotal connections is continued through bar n 150 of the first set and bar n 152 of the second set.

Also included is a first terminal bar 154 having a first end 156 and a second end 158, and a second terminal bar 160 having a first end 162 and a second end 158. The lengths of the terminal bars 154 and 160 are half that of the other bars, for example, 134 and 138. The first end 156 of the first terminal bar 154 is pivotally connected to the second end 156 of bar n 150 of the first set, and the first end 162 of the second terminal bar 160 is pivotally connected to the second end 162 of bar n 152 of the second set. The second end 158 of the first terminal bar 154 is pivotally connected to the second end 158 of the second terminal bar 160.

Figure 14:
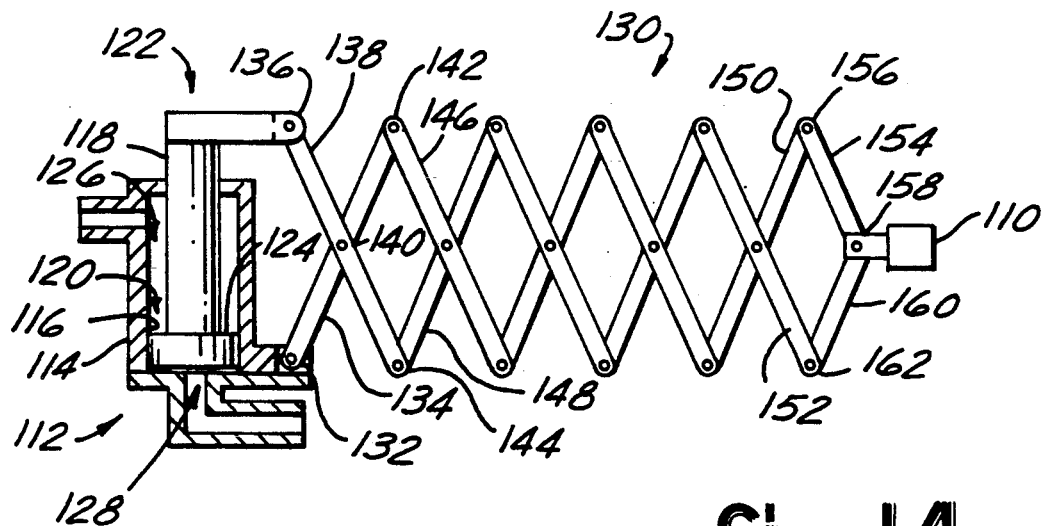
FIG. 14 is a view of the element illustrated by FIG. 13 and shown in a second condition.

A contact, or compression, sensing means, or sensor, 110 is disposed at the juncture 158 of the first and second terminal bars 154 and 160 respectively. When fluid is forced into the extending portion 126 of the parallel-bar expanding feeler cylinder 114 and vented from the retracting portion 128, the piston 118 is retracted, pulling the first end 136 of bar 1 138 of the second set of bars toward the first end 132 of bar 1 134 of the first set of bars and forcing the parallel-bar expanding feeler 130 to expand as shown in FIG. 14.

Figure 13:
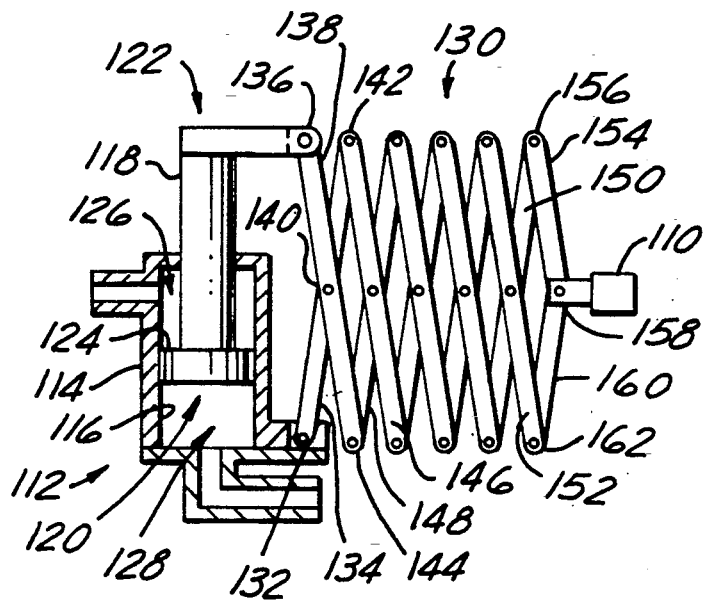
FIG. 13 is a view, partly in section, of yet another embodiment, shown in a first condition, of the invention.

Conversely, when fluid is forced into the retracting portion 128 of the parallel-bar expanding feeler cylinder 114 and vented from the extending portion 126, the piston 118 is extended, forcing the first end 136 of bar 1 138 of the second set of bars away from the first end 132 of bar 1 134 of the first set of bars and forcing the parallel-bar expanding feeler 130 to retract as shown in FIG. 13.

As shown in FIG. 15 of the drawings, a programmable logic means, or microprocessor, 84 is also included in the automatic braking actuation system 10 and is electrically connected to the compression 22, compression rate 62, vehicle wheel speed 24 and feeler position 28 sensors. The microprocessor 84 monitors the sensors and, as a function thereof, and in accordance with preselected program parameters, controls the extension and retraction of the feeler and the actuation of the vehicle braking system. As would be obvious to those skilled in the art, the compression rate sensor 62 could be used to detect contact with an object as well as to detect rate of compression.

The microprocessor 84 includes a first function generator 86, which is responsive to signals indicating the position of the feeler, the vehicle speed and object contact to generate a feeler positioning signal. The latter signal is communicated to a feeler extension controller 88, which controls a feeler extension actuator 90 for each feeler. The feeler extension actuator 90 includes, depending on the previously described automatic brake actuation system embodiment involved, well-known electric controls for supplying multiphase, alternating current in various phase sequences, for example, to the linear motor 68 or for supplying direct current in both polarities, for example, to the rotating motor 72. It may alternatively include well-known fluid controls to act as extending means, or devices, and retracting means, or devices, for supplying fluid under pressure, for example, to the feeler cylinder 33, to the feeler tube 102 or to the parallel-bar expanding feeler cylinder 114.

The microprocessor 84 also includes a second function generator 92, which is responsive to signals indicating the position of the feeler, the vehicle speed, object contact and vehicle-object closing speed to generate a braking system actuating signal. The latter signal is communicated to a braking system actuation controller 94, which controls a braking system actuator 96. The braking system actuator 96 may be any one of many well-known systems such as one including a solenoid-actuated lever that applies pressure to an existing brake pedal mechanism. For safety and practical reasons, during a collision, power to the various sensors may be discontinued after their functions have been performed.

A method for automatically actuating an existing braking system on a vehicle 14 approaching an object when contact with the object is made includes sensing vehicle speed, extending a detector 12 from the vehicle by a predetermined amount as a function of vehicle speed, sensing the object upon contacting it with the detector 12, retracting the detector 12 upon contacting the object, sensing the relative closing speed of the vehicle 14 and the object, and actuating the braking system upon object contact to brake the vehicle as a function of the detector position, the vehicle speed, and the relative closing speed of the vehicle 14 and the object.

While the best mode for carrying out the invention has been described in detail, those familiar with the art to which this invention relates will recognize various alternative designs and embodiments for practicing the invention as disclosed by the following claims.

What is claimed is:

1. An automatic brake actuation system for use on a vehicle having an existing braking system, the automatic brake actuation system comprising:

at least one detector mounted to the vehicle and being controllably extendable from the vehicle to contact objects at predetermined distances from the vehicle;

contact sensing means for sensing a contact between the at least one detector and an object being approached by the vehicle; and programmable logic means for controlling, according to selectable program parameters, extension and retraction of the detector and the actuation of the existing vehicle braking system in response to signals from the contact sensing means to slow and stop the vehicle upon contacting an object.

2. The automatic brake actuation system defined by claim 1, wherein the at least one detector comprises:

a support member mounted to the vehicle; and an elongate feeler supported by the support member, the feeler having a longitudinal axis along which it is slidably extendable by predetermined amounts from the support member.

3. The automatic brake actuation system defined by claim 2, further including extending means for at least partially extending the elongate feeler from the support member and retracting means for withdrawing the support member.

4. The automatic brake actuation system defined by claim 3, wherein the extending means comprises a linear, multiphase, electric induction motor having stator windings linearly disposed along the support member and a feeler winding linearly disposed along the feeler, the stator windings being connected such that, when multiphase current is applied to the stator windings in a first phase sequence, a linear force is applied to the feeler winding in a first direction, extending the feeler from the support member and such that, when multiphase current is applied to the stator windings in a second phase sequence, a linear force is applied to the feeler winding in a second direction, retracting the feeler into the support member.

5. The automatic brake actuation system defined by claim 3, wherein the extending means comprises an electric motor mounted to the vehicle, the electric motor having a rotatable shaft coupleable to the feeler to exert an axial force upon the feeler in an extending direction in response to an application of electric current in a first direction to the motor.

6. The automatic brake actuation system defined by claim 5, wherein the retracting means comprises the electric motor, the electric motor exerting an axial force upon the feeler in a retracting direction in response to an application of electric current in a second direction to the motor.

7. The automatic brake actuation system defined by claim 5, wherein the rotatable shaft of the electric motor is coupleable to the feeler through at least one gear.

8. The automatic brake actuation system defined by claim 7, wherein:

the at least one gear is a pinion connected to the rotatable shaft of the electric motor; and the feeler has a rack connected thereto, the rack being engageable with the pinion to translate an angular displacement of the rotatable shaft into a longitudinal displacement of the feeler.

9. The automatic brake actuation system defined by claim 7, wherein:

the at least one gear is a worm gear connected to the rotatable shaft of the electric motor; and the feeler has a worm connected thereto, the worm being engageable with the worm gear to translate an angular displacement of the rotatable shaft into a longitudinal displacement of the feeler.

10. The automatic brake actuation system defined by claim 3, wherein:

the support member forms a feeler cylinder having an inside surface;

the feeler has a confined end and a free end, the confined end residing within the feeler cylinder, the free end extending outwardly therefrom, a piston plate being disposed at the confined end to form a slidable seal with the inside surface of the feeler cylinder, the piston plate dividing the feeler cylinder into an extending portion and a retracting portion; and the extending means includes a device that admits fluid under pressure into the extending portion and vents fluid from the retracting portion of the feeler cylinder to longitudinally drive the feeler at least partially from the feeler cylinder.

11. The automatic brake actuation system defined by claim 10, wherein the retracting means includes a device that admits fluid under pressure into the retracting portion and vents fluid from the extending portion of the feeler cylinder to longitudinally drive the feeler into the feeler cylinder.

12. The automatic brake actuation system defined by claim 3, further including a resilient retracting device connected between the support member and the feeler to draw the feeler longitudinally into the support member when no force is being applied to the feeler to extend it.

13. The automatic brake actuation system defined by claim 12, wherein the resilient retracting device includes a helical spring.

14. The automatic brake actuation system defined by claim 12, further including a damming device mounted to the support member to halt motion of the feeler after the feeler has been retracted.

15. The automatic brake actuation system defined by claim 1, wherein the at least one detector comprises:

a support member mounted to the vehicle, the support member having a hollow, cylindrical portion;

an inflatable feeler tube having an open end and a closed end, the feeler tube being attached to and supported by the support member, the hollow, cylindrical portion of the support member connecting the feeler tube to a source of fluid under pressure for inflating the feeler tube, the feeler tube having a coiled configuration when deflated and an elongate configuration when inflated; and a spiral spring attached to the feeler tube to maintain the feeler tube in a coiled configuration until the feeler tube is inflated and to return the feeler tube to a coiled configuration when the feeler tube is deflated; and wherein the contact sensing means is disposed at the closed end of the inflatable feeler tube.

16. The automatic brake actuation system defined by claim 15, further including strain gauges disposed along the length of the spiral spring to detect sharp curvature changes in the spiral spring caused by laterally directed impacts.

17. The automatic brake actuation system defined by claim wherein the at least one detector comprises:

a support member mounted to the vehicle, a parallel-bar expanding feeler cylinder having an inside surface being formed in a portion of the support member;

a piston having a confined end and a free end, the confined end residing within the parallel-bar expanding feeler cylinder, the free end extending outwardly therefrom, a piston plate being disposed at the confined end of the piston to form a slidable seal with the inside surface of the parallel-bar expanding feeler cylinder, the piston plate dividing the parallel-bar expanding feeler cylinder into an extending portion and a retracting portion; and a parallel-bar expanding feeler having a first set of 1 through n bars and a second set of 1 through n bars, the bars in both sets having substantially the same dimensions and being disposed in a common plane, each bar of each set having a first end and a second end, the first end of bar 1 of the first set being pivotally connected to the support member, the first end of bar 1 of the second set being pivotally connected to the free end of the piston, the center of bar 1 of the first set being pivotally connected to the center of bar 1 of the second set, the second end of bar 1 of the first set being pivotally connected to the first end of bar 2 of the first set, the second end of bar 1 of the second set being pivotally connected to the first end of bar 2 of the second set, this sequence of pivotal connections being continued through bar n of the first set and bar n of the second set, a first terminal bar having a first end and a second end, a second terminal bar having a first end and a second end, the lengths of the terminal bars being half that of the other bars, the first end of the first terminal bar being pivotally connected to the second end of bar n of the first set, the first end of the second terminal bar being pivotally connected to the second end of bar n of the second set, the second end of the first terminal bar being pivotally connected to the second end of the second terminal bar; and wherein the contact sensing means is disposed proximate the juncture of the first and second terminal bars.

18. The automatic brake actuation system defined by claim 17, further including:

an extending device that admits fluid under pressure into the extending portion of the parallel-bar expanding feeler cylinder and vents fluid from the retracting portion to force the piston into the parallel-bar expanding feeler cylinder, forcing the first end of bar 1 of the second set of bars toward the first end of bar 1 of the first set and extending the parallel-bar expanding feeler; and a retracting device that admits fluid under pressure into the retracting portion of the parallel-bar expanding feeler cylinder and vents fluid from the extending portion to force the piston at least partially from the parallel-bar expanding feeler cylinder, forcing the first end of bar 1 of the second set of bars away from the first end of bar 1 of the first set and retracting the parallel-bar expanding feeler.

19. The automatic brake actuation system defined by claim 3, wherein the contact sensing means comprises:

compression sensing means for sensing a compression of the feeler to determine the occurrence of an impact between the feeler and an object being approached by the vehicle; and compression rate sensing means for sensing the rate of compression of the feeler to determine the relative closing speed of the vehicle and the object.

20. The automatic brake actuation system defined by claim 19, further including:

vehicle wheel speed sensing means for sensing the angular velocity of a vehicle wheel to determine vehicle speed; and feeler position sensing means for sensing the longitudinal position of the feeler how far the feeler is extended from the vehicle.

21. The automatic brake actuation system defined by claim 20, further including programmable logic means for controlling the extension and retraction of the feeler and the actuation of the existing vehicle braking system in response to signals from the compression sensing means, from the compression rate sensing means, from the vehicle wheel speed sensing means, and from the feeler position sensing means to position the feeler, and to slow and stop the vehicle upon contacting an object, according to selectable program parameters.

22. The automatic brake actuation system defined by claim 21, wherein the programmable logic means includes a microprocessor comprising:
 a first function generator to generate a feeler positioning signal in response to vehicle speed and to a signal from the compression sensing means;
 a feeler extension controller to control the extending means in response to the feeler positioning signal;
 a second function generator to generate a braking system actuating signal in response to signals from the compression sensing means and the compression rate sensing means; and
 a braking system actuation controller to control the braking system in response to the braking system actuating signal.

23. A method for automatically actuating a braking system on a vehicle approaching an object in response to detecting the object within a predetermined distance from the vehicle, the method comprising the steps of:
 extending the at least one detector from the vehicle to detect an object being approached by the vehicle;
 sensing the object upon contacting it with the at least one detector;
 calculating, according to predetermined parameters, the amount and application of braking force necessary to stop the vehicle short of the object; and
 actuating the braking system to brake the vehicle according to calculated parameters.

24. The method of claim 23, further including the steps of:
 sensing vehicle speed;
 sensing the relative closing speed of the vehicle and the object; and
 retracting the at least one detector upon sensing the object;
 and wherein:
 the amount by which the at least one detector is extended from the vehicle is a function of vehicle speed; and
 the actuation of the braking system is a function of the vehicle speed, the relative closing speed of the vehicle and the object, and the predetermined parameters.

25. A system for automatically actuating a braking system on a vehicle approaching an object in response to detecting the object within a predetermined distance from the vehicle, the system comprising:
 means for extending the at least one detector from the vehicle to detect an object being approached by the vehicle;
 means for sensing the object upon contacting it with the at least one detector;
 means for calculating, according to predetermined parameters, the amount and application of braking force necessary to stop the vehicle short of the object; and
 means for actuating the braking system to brake the vehicle according to calculated parameters.

26. The system of claim 25, further including:
 means for sensing vehicle speed;
 means for sensing the relative closing speed of the vehicle and the object; and
 means for retracting the at least one detector upon sensing the object;
 and wherein:
 the amount by which the at least one detector is extended from the vehicle is a function of vehicle speed; and
 the actuation of the braking system is a function of the vehicle speed, the relative closing speed of the vehicle and the object, and the predetermined parameters.

* * * * *